US 8,896,888 B2
Nov. 25, 2014

(12) United States Patent
Atwood et al.

(10) Patent No.: US 8,896,888 B2
(45) Date of Patent: Nov. 25, 2014

(54) SERVICEABLE SENSOR ASSEMBLY AND METHOD

(75) Inventors: Mark A. Atwood, Rush, NY (US); Kevin M. McGlynn, Marion, NY (US); Frederick O. Hayes, III, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 278 days.

(21) Appl. No.: 13/464,430

(22) Filed: May 4, 2012

(65) Prior Publication Data

US 2013/0292445 A1   Nov. 7, 2013

(51) Int. Cl.
*H04N 1/024* (2006.01)
*H04N 1/00* (2006.01)

(52) U.S. Cl.
CPC ....... *H04N 1/00533* (2013.01); *H04N 1/00557* (2013.01)
USPC .............................. 358/471; 358/305; 347/19

(58) Field of Classification Search
CPC .......... H04N 1/00533; H04N 1/00557; H04N 1/0249; H04N 1/02481; H04N 1/02454; H04N 2201/0446; H04N 1/0318; H04N 1/03112; H04N 1/0315; H04N 1/03154; H04N 1/03179; H04N 1/00909
USPC ........ 400/656, 648; 250/522.1; 358/296, 497, 358/305
See application file for complete search history.

(56) References Cited

U.S. PATENT DOCUMENTS

| | | | | |
|---|---|---|---|---|
| 5,280,364 A | * | 1/1994 | Kihara et al. | 358/400 |
| 5,859,421 A | * | 1/1999 | Onishi et al. | 250/208.1 |
| 6,376,822 B1 | * | 4/2002 | Fujimoto et al. | 250/208.1 |
| 6,738,165 B2 | * | 5/2004 | Sawada | 358/475 |
| 2010/0020421 A1 | * | 1/2010 | Shimmo et al. | 359/811 |

FOREIGN PATENT DOCUMENTS

JP   2008154110 A   *   7/2008   ............. H04N 1/028

* cited by examiner

*Primary Examiner* — Daniel J Colilla
(74) *Attorney, Agent, or Firm* — Simpson & Simpson, PLLC

(57) ABSTRACT

A sensor assembly for a printer arranged to displace printed material along a path, including a sensor housing and a platen assembly. The sensor housing includes top surfaces and resilient elements fixed to the top surfaces, and houses light emitting elements. The platen assembly includes transparent material and a platen housing with a plurality of steps, and is arranged to engage the sensor housing and displace in a first direction along the sensor housing toward an end of the sensor housing such that the transparent material is aligned with the light emitting elements in a direction orthogonal to the axis. As the platen assembly displaces in the first direction, the plurality of resilient elements is arranged to engage the plurality of steps to urge the piece of transparent material into contact with the sensor housing with progressively greater force such that the transparent material is sealed against the sensor housing.

20 Claims, 14 Drawing Sheets

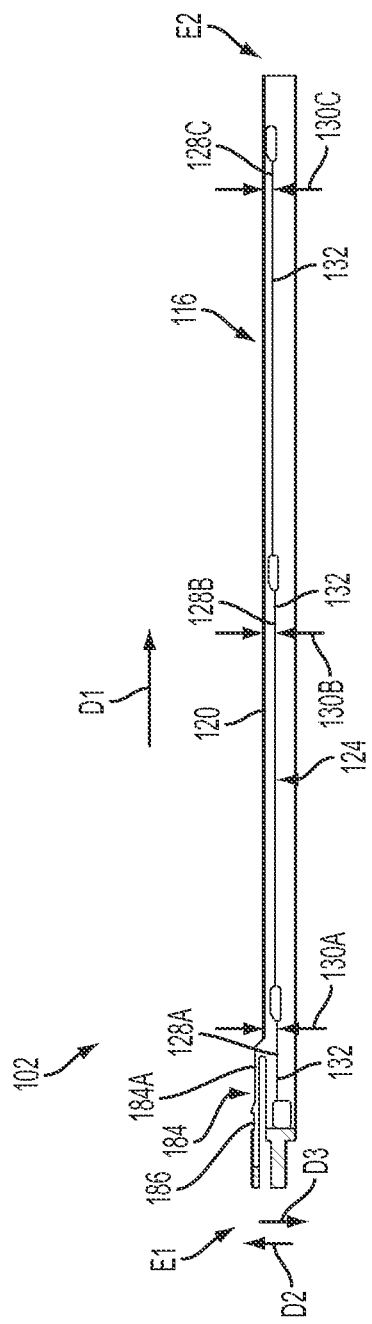

SERVICEABLE SENSOR ASSEMBLY AND METHOD

TECHNICAL FIELD

The present disclosure relates to a sensor assembly and method enabling improved ease of maintenance and reducing false errors. Specifically, the sensor assembly includes a platen assembly, with a transparent material, removeably engageable with a sensor assembly in which light emitting elements and a lens can be located. The transparent material is disposed between the light emitting elements and lens and a path for printed material in a printer, and sealed to a sensor housing.

BACKGROUND

In printers, in particular, high speed printers printing on continuous rolls of material, a sensor arrangement is used to check the quality of the printed indicia on the material. For example, light emitting elements in the sensor arrangement transmit light to the printed material as the printed material is transported along a path under, typically orthogonal to, the sensor arrangement. The transmitted light is reflected of the printed material upward to a lens in the sensor arrangement. After passing through the lens, the reflected light, which includes data regarding the printed indicia, is analyzed by the sensor arrangement to evaluate the quality of the printed indicia, for example, to check for registration errors.

Typically, the sensor arrangement is quite close to the material as the material is transported along the path as high speeds. The transport of the printed material causes detritus, such as dust from the material and ink solids, to be dispersed toward and into the sensor arrangement. The detritus can adhere to the light emitting elements and/or lens causing the sensor arrangement to interpret the detritus deposits as errors in the printed indicia. If the perceived errors are sufficiently large, the sensor arrangement can issue a warning that the quality of the printed indicia has been compromised or may even initiate automatic shut-down procedures. The warning and shut-downs can increase down time. Further, to remove the detritus from the sensor arrangement, it is typically necessary to employ trained service personnel, rather than users of the printer, to partially dissemble the sensor arrangement to access the components that must be cleaned. Employing trained personnel instead of users, increases down time and costs associated with operating the printer.

SUMMARY

According to aspects illustrated herein, there is provided a platen housing for a printer arranged to transport printed material along a path in a process direction, including: first and second ends; and first and second side rail segments connecting the first and second ends. The first segment includes: a first top surface; and a first bottom surface forming a plurality of first steps, each first step with a thickness, with respect to the first top surface, less than a first step immediately preceding said each first step in a direction from the first end toward the second end. The second segment includes: a second top surface; and a second bottom surface forming a plurality of second steps, each second step with a thickness, with respect to the second top surface, less than a second step immediately preceding said each second step in a direction from the first end toward the second end. The platen housing is arranged to: engage a sensor assembly for the printer, disposed orthogonally above the path, and including a plurality of light emitting elements; and receive a piece of transparent material such that the transparent material is between the path and the plurality of light emitting elements such that the platen housing and the transparent material isolate the light emitting elements from the printed material.

According to aspects illustrated herein, there is provided a sensor housing for a printer arranged to transport printed material along a path in a process direction, including: first and second ends; and first and second side rail segments connecting the first and second ends. The first segment includes: a first top surface; a first bottom surface; and a plurality of first resilient elements attached to the first top surface, each first resilient element located further from the first bottom surface than a first resilient element immediately preceding said each first resilient element in a direction from the first end toward the second end. The second segment includes: a second top surface; a second bottom surface; and a plurality of second resilient elements attached to the second top surface, each second resilient element located further from the second bottom surface than a second resilient element immediately preceding said each second resilient element in a direction from the first end toward the second end. The sensor housing is arranged to be disposed orthogonally above the path and house a plurality of light emitting elements.

According to aspects illustrated herein, there is provided a sensor assembly for a printer arranged to transport printed material along a path in a process direction, including a longitudinal axis, a sensor housing, and a platen assembly, The sensor housing includes: first and second top surfaces; and a plurality of resilient elements fixed to the first and second top surfaces. The platen assembly includes a platen housing with a plurality of steps, and transparent material. The sensor housing is arranged to house a plurality of light emitting elements. The platen assembly is arranged to engage a first end of the sensor housing and displace in a first direction along the sensor housing toward a second end of the sensor housing such that the transparent material is aligned with the plurality of light emitting elements in a direction orthogonal to the longitudinal axis. As the platen assembly displaces in the first direction, the plurality of resilient elements is arranged to engage the plurality of steps to urge the piece of transparent material into contact with the sensor housing with progressively greater force such that the transparent material is sealed against the sensor housing.

According to aspects illustrated herein, there is provided a printer arranged to transport printed media along a plane in a process direction, including a sensor assembly, disposed above the plane in a transverse direction orthogonal to the process direction. The sensor assembly includes a plurality of light emitting elements, a sensor housing, and a platen assembly. The sensor housing includes: a first sensor side rail including a first bottom surface and a first top surface forming a plurality of first steps, each first step with a thickness, with respect to the first bottom surface, greater than a first step immediately preceding said each first step in a first direction parallel to the traverse direction; a second sensor side rail including a second bottom surface and a second top surface forming a plurality of second steps, each second step with a thickness, with respect to the second bottom surface, greater than a second step immediately preceding said each second step in the first direction; and a respective resilient element fixed to each first and second step. The platen assembly includes a platen housing engageable with and removable from the sensor housing in the traverse direction. The platen housing includes: a first platen side rail including a third top surface and a third bottom surface forming a plurality of third steps, each third step with a thickness, with respect to the third top surface, less than a third step immediately preceding said each third step in the first direction; a second platen side rail including a fourth top surface and a fourth bottom surface forming a plurality of fourth steps, each fourth step with a thickness, with respect to the fourth top surface, less than a fourth step immediately preceding said each fourth step in the first direction; and transparent material fixed to the platen housing. When the platen housing is engaged the sensor housing and displaced a maximum distance in the first direction, the transparent material is between the plane and the light emitting elements and the respective resilient elements engage the pluralities of third and fourth steps to apply a first force to the platen housing to urge the transparent material into sealing contact with the sensor housing. When the platen housing is engaged with the sensor housing and displaced a distance in the first direction less than the maximum distance, the respective resilient elements are free of contact with the pluralities of third and fourth steps such that the transparent material is free of contact with the sensor housing.

According to aspects illustrated herein, there is provided a method of sealing a sensor assembly for a printer arranged to transport printed material along a path in a process direction, the sensor assembly including a sensor housing and a platen assembly, including: engaging a first end of the platen housing with a first end of the sensor housing; and applying progressively greater force to the platen housing to urge transparent material fixedly connected to the platen housing into contact with the sensor housing by: displacing the platen housing a first distance in a first direction toward a second end of the sensor housing; and displacing the first end of the platen housing an additional distance in the first direction, such that a plurality of resilient elements fixed to first and second top surfaces of the sensor housing engages a plurality of stepped surfaces for the platen housing. The method includes: aligning the transparent material with a plurality of light emitting elements disposed in the sensor housing in a direction orthogonal to the first and second top surfaces; and sealing the transparent material against the sensor housing.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 5 is a cross-sectional view generally along line 5-5 in FIG. 4;

DETAILED DESCRIPTION

As used herein, the words "printer," "printer system", "printing system", "printer device" and "printing device" as used herein are interchangeable and encompasses any apparatus, such as a digital copier, bookmaking machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, a server, one or more personal computers, a standalone scanner, a mobile phone, an MP3 player, audio electronics, video electronics, GPS systems, televisions, recording and/or reproducing media or any other type of consumer or non-consumer analog and/or digital electronics.

Moreover, although any methods, devices or materials similar or equivalent to those described herein can be used in the practice or testing of these embodiments, some embodiments of methods, devices, and materials are now described.

Figure 1:
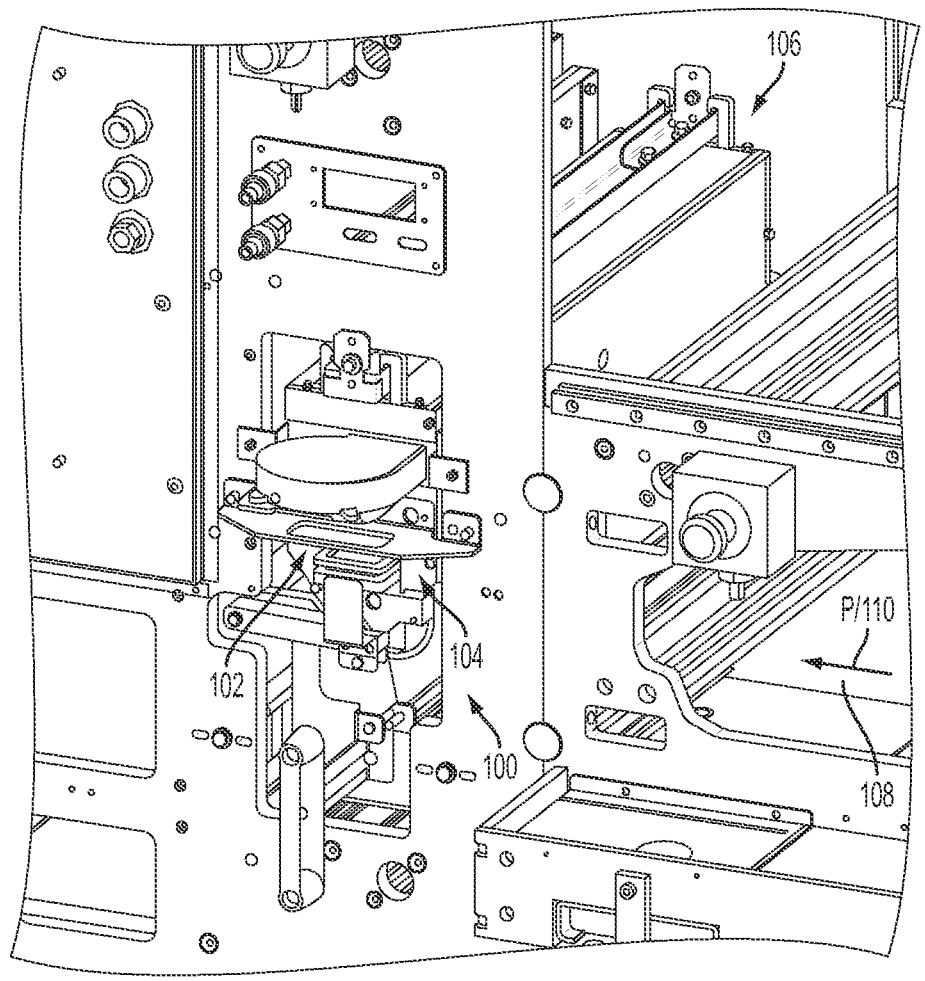
FIG. 1 is a perspective view of a sensor assembly in a printer arranged to transport printed material along a path in a process direction.

FIG. 1 is a perspective view of sensor assembly 100 in a printer arranged to transport printed material along a path in a process direction.

Figure 2:
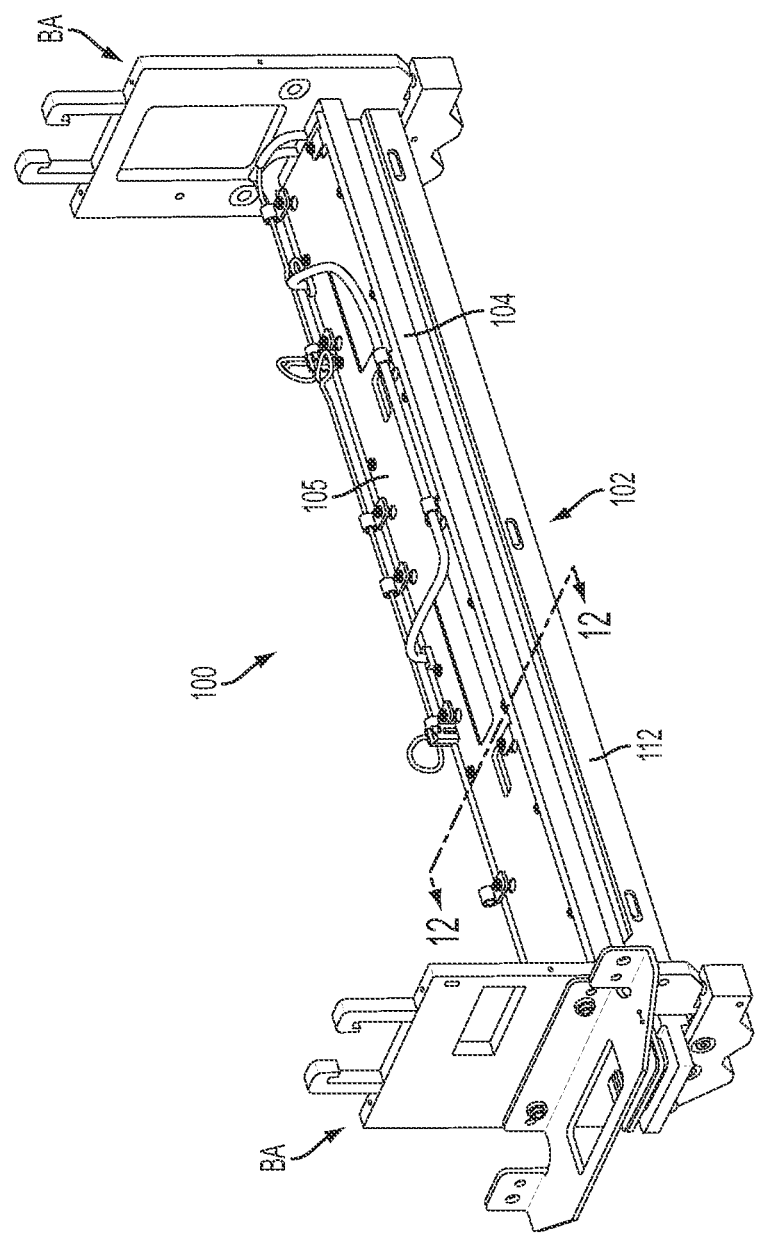
FIG. 2 is a perspective view of the sensor assembly shown in FIG. 1.

FIG. 2 is a perspective view of sensor assembly 100 shown in FIG. 1.

Figure 3:
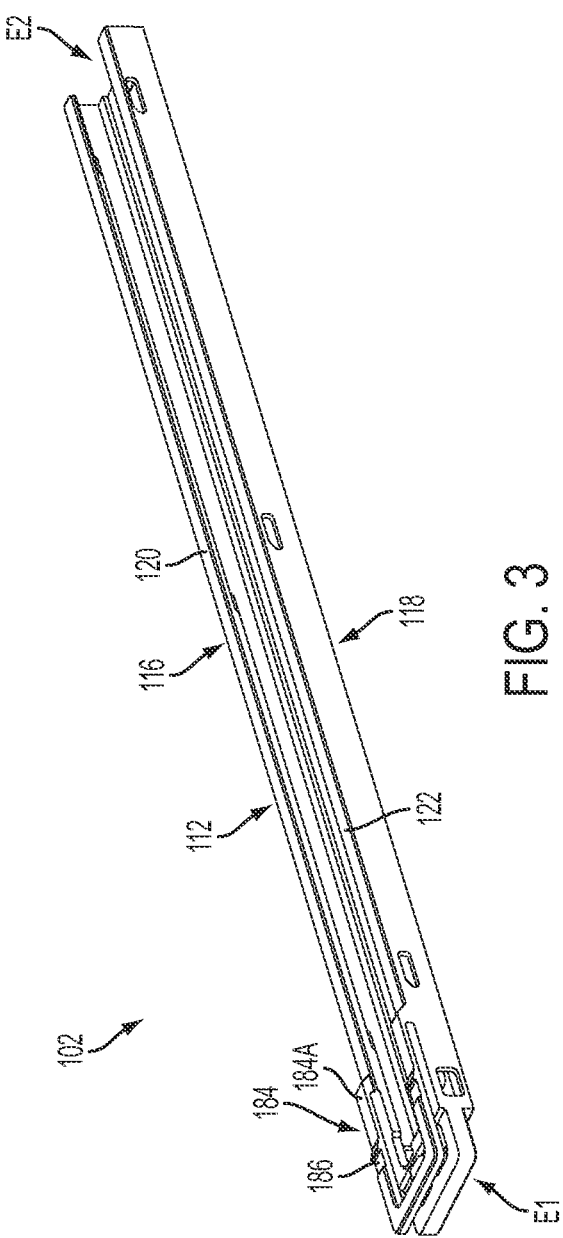
FIG. 3 is a perspective view of the platen assembly shown in FIG. 2.

FIG. 3 is a perspective view of platen assembly 102 shown in FIG. 2.

Figure 4:
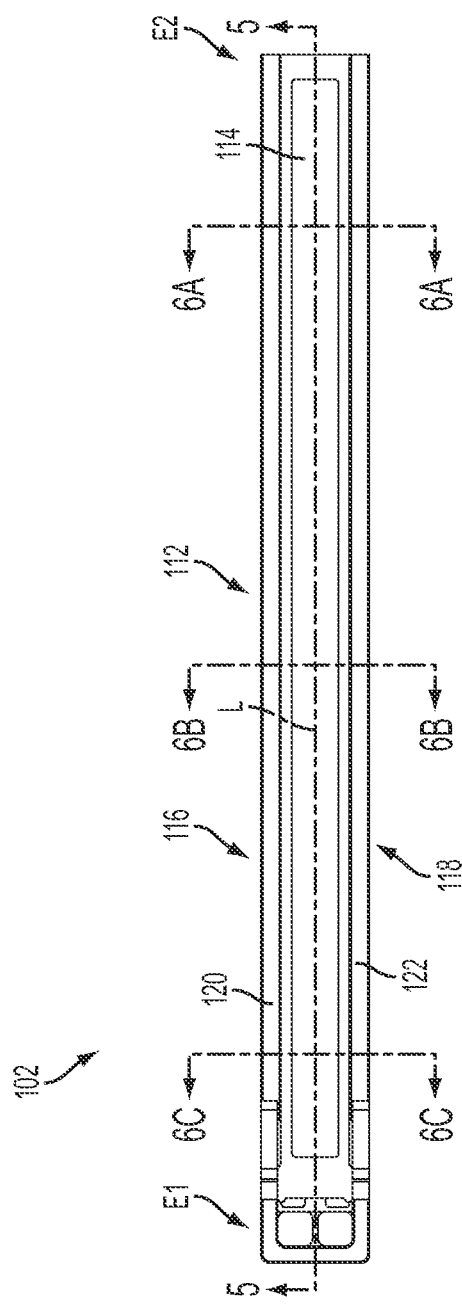
FIG. 4 is a top view of the platen assembly shown in FIG. 2.

FIG. 4 is a top view of platen assembly 102 shown in FIG. 2.

FIG. 5 is a cross-sectional view generally along line 5-5 in FIG. 4.

Figure 6A:
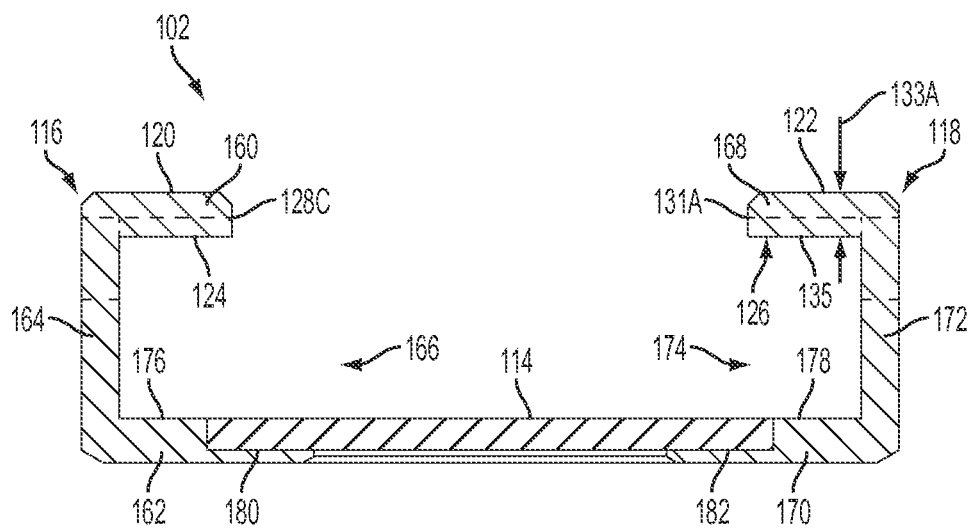
FIG. 6A is a cross-sectional view generally along line 6A-6A in FIG. 4.
Figure 6B:
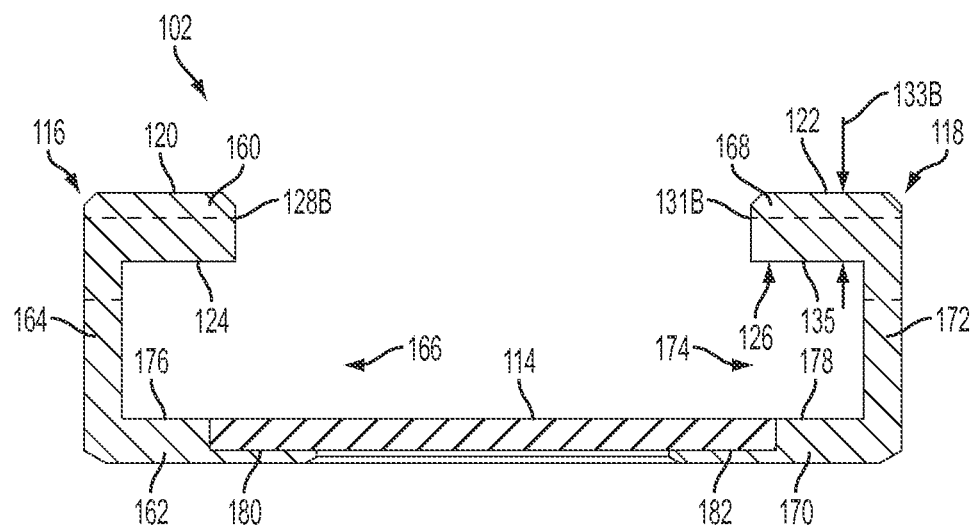
FIG. 6B is a cross-sectional view generally along line 6B-6B in FIG. 4.
Figure 6C:
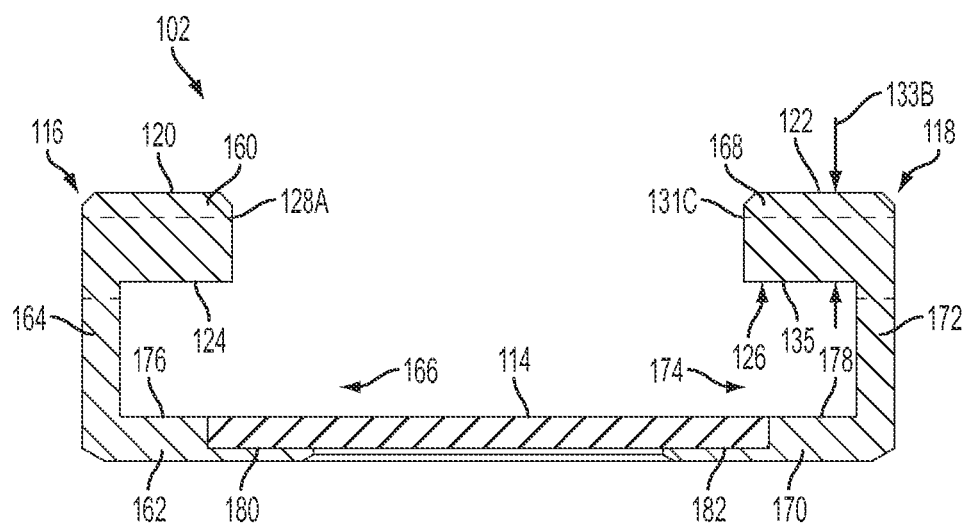
FIG. 6C is a cross-sectional view generally along line 6C-6C in FIG. 4.

FIGS. 6A, 6B, and 6C are cross-sectional views generally along lines 6A-6A, 6B-6B, and 6C-6C, respectively, in FIG. 4. The following should be viewed in light of FIGS. 1 through 6C. Sensor assembly 100 includes platen assembly 102 and sensor housing 104. In an example embodiment, the sensor housing is arranged to receive control assembly 105. In an example embodiment, assembly 100 is part of printer 106 arranged to transport printed material 108 along path 110 in process direction P. In some aspects, printer 106 is an MFD. In an example embodiment, material 108 is in the form of a continuous roll. Platen assembly 102 includes platen housing 112 and transparent material 114 fixedly secured to housing 112 by any means known in the art. Housing 112 includes oppositely disposed ends E1 and E2 and side rail segments 116 and 118 connecting E1 and E2. Segments 116 and 118 include top surfaces 120 and 122, respectively, and bottom surfaces 124 and 126, respectively.

Bottom surface 124 forms steps. Each step has a thickness, or height, with respect to top surface 120, less than a thickness for any step immediately preceding the step in direction D1 from E1 toward E2. Thus, the thicknesses or the heights decrease in direction D1, for example thickness 130B for step 128B is less than 130A for step 128A and 130C for step 128C is less than 130B. In like manner, bottom surface 126 forms steps symmetrical with respect to longitudinal axis L of housing 112. For example, surface 126 forms steps 131A, 131B, and 131C aligned with steps 128A, 128B, and 128C, respectively, orthogonal to L, and having thicknesses or heights, 133A, 133B, and 133C substantially equal to thicknesses 130A, 130B, and 130C, respectively.

In an example embodiment, top surfaces 120 and 122 are coplanar. The steps of surface 124 include surfaces 132 and steps in surface 126 include surfaces 135 coplanar with surfaces 132. Stated otherwise: steps 128A and 131A; steps 128B and 131B; and steps 128C and 131C, equidistant from end E1, are coplanar.

Figure 7:
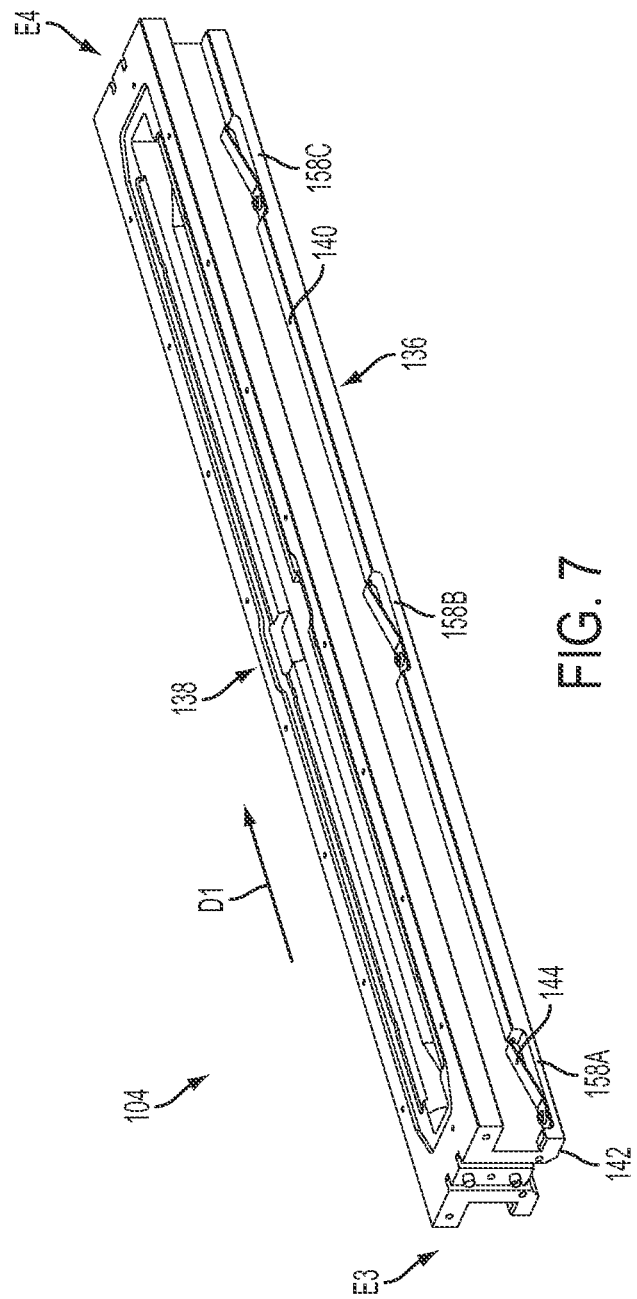
FIG. 7 is a perspective view of the sensor housing shown in FIG. 2 with ancillary parts and the control assembly removed.

FIG. 7 is a perspective view of sensor housing 104 shown in FIG. 2 with ancillary parts and the control assembly removed.

Figure 8:
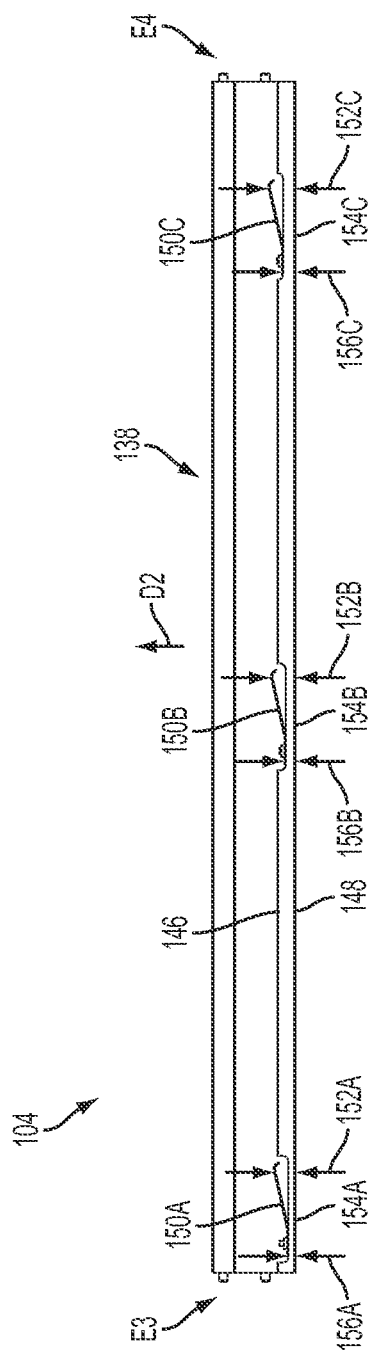
FIG. 8 is a side view of the sensor housing shown in FIG. 7.

FIG. 8 is a side view of sensor housing 104 shown in FIG. 7.

Figure 9:
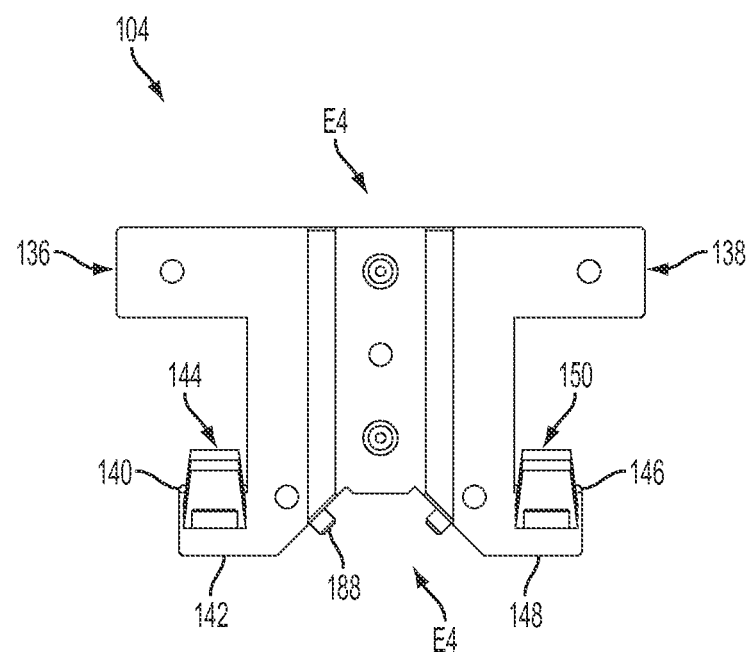
FIG. 9 is an end view of the sensor housing shown in FIG. 8.

FIG. 9 is an end view of sensor housing 104 shown in FIG. 2. The following should be viewed in light of FIGS. 1 through 9. In FIGS. 7 through 9, the control assembly and ancillary parts, such as bracket assemblies BA, have been removed to clarify the presentation. Housing 104 includes ends E3 and E4, and side rail segments 136 and 138 connecting ends E3 and E4. Segment 136 includes top surface 140, bottom surface 142, and resilient elements 144 attached to top surface 140. Each resilient element 144 is located further from bottom surface 142 than a resilient element 144 immediately preceding the resilient element 144 in direction D1 from end E3 toward E4.

Segment 138 includes top surface 146, bottom surface 148, and resilient elements 150 attached to top surface 146. Each resilient element 150 is located further from bottom surface 148 than a resilient element 150 immediately preceding the resilient element 150 in direction D1. For example, in a direction D2 orthogonal to surface 148, a furthest portion of resilient element 150A is a distance 152A from surface 148; and distance 152B for resilient element 150B is greater than 150A. In like manner, distance 152C for resilient element 150C is greater than distance 152B. Any resilient element known in the art can be used for resilient elements 144 and 150.

In an example embodiment, surface 146 forms steps 154. Each step 154 has a thickness or height (in direction D2); with respect to bottom surface 148, greater than a step 154 immediately preceding the step 154 in direction D1. For example, distance 156B for step 154B is greater than distance 156A for step 154A and distance 156C for step 154C is greater than distance 156B. A respective resilient element 150 is attached to step 154. In like manner, surface 140 forms steps 158A-158C. The discussion regarding distances 152 and 156 is applicable to segment 136, bottom surface 142, resilient elements 144, and steps 158A-158C.

In an example embodiment, the sensor housing is arranged to be disposed orthogonally above path P and to house a plurality of light emitting elements, as further described below.

Returning to platen housing 102, segment 116 includes rails 160 and 162 connected by side segment 164 orthogonal to rails 160 and 162. Rails 160 and 162 and segment 164 form groove 166 facing segment 118. In like manner, segment 118 includes rails 168 and 170 connected by side segment 172 orthogonal to rails 168 and 170. Rails 168 and 170 and segment 172 form groove 174 facing segment 116. Grooves 166 and 174 are arranged to engage sensor housing 104.

In an example embodiment, rails 162 and 170 include surfaces 176 and 178, respectively. Surfaces 176 and 178 include notches 180 and 182, continuous with grooves 166 and 174, respectively, and arranged to receive transparent material 114. Material 114 is fixedly secured to notches 180 and 182 by any means known in the art, including, but not limited to adhesive and adhesive tape.

The following describes the interfacing of platen assembly 102 with sensor housing 104. Platen assembly 102 is removeably attachable to sensor housing 104. For example, end E2 of the platen assembly is arranged to engage end E3 of the sensor housing, for example grooves 166 and 174 engage segments 138 and 136, respectively, and the platen assembly is displaceable in direction D1 along the sensor housing toward end E4 of the sensor housing such that the transparent material is aligned with control assembly 105 in a direction D2. As the platen assembly displaces in direction D1, resilient elements 144 and 150 are arranged to engage the steps of housing 112 to urge transparent material 114 into contact with the sensor housing with progressively greater force such that the transparent material is sealed against the sensor housing. For example, resilient elements 150 are arranged to engage steps 128.

Figure 10:
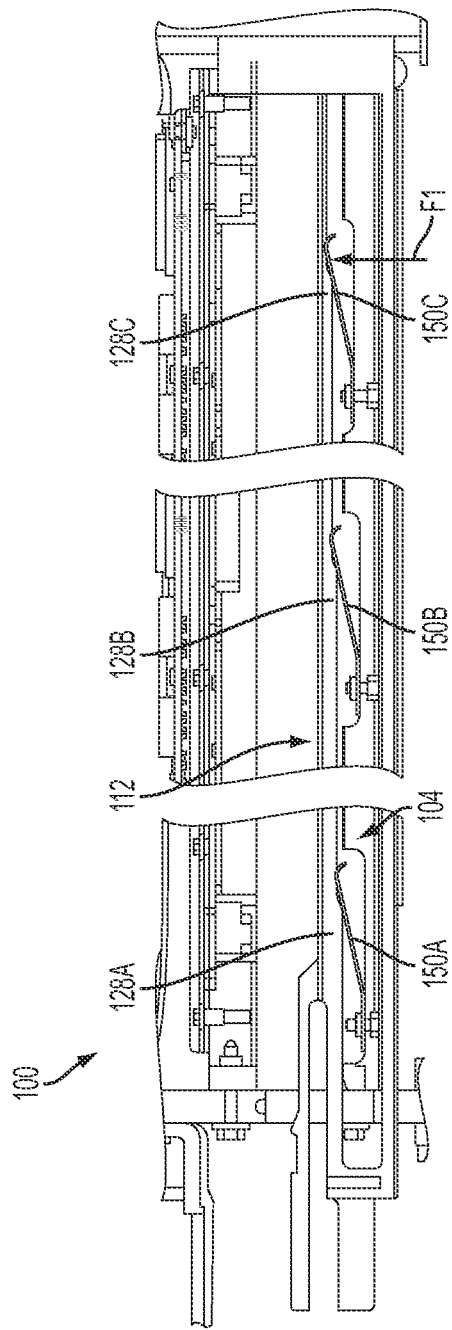
FIG. 10 is a side cut away view of the sensor assembly of FIG. 2 showing the platen assembly in a position in which the steps of the platen housing are about the contact the resilient elements.

FIG. 10 is a side cut away view of sensor assembly 100 of FIG. 2 showing platen assembly 102 in a position in which steps 128 of platen housing 112 are about the contact resilient elements 150.

Figure 11:
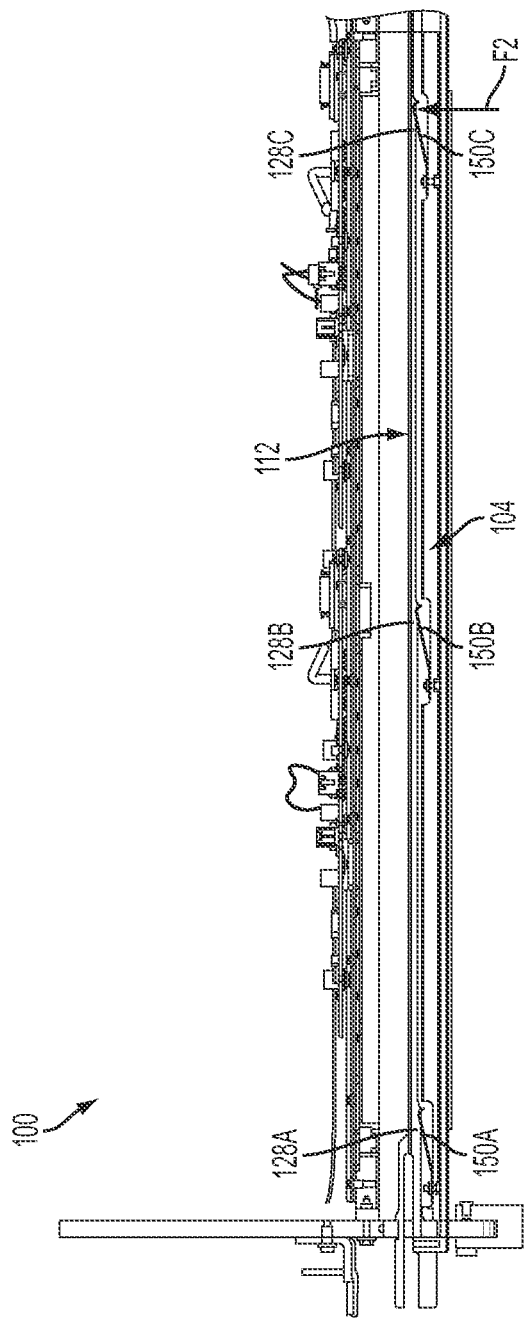
FIG. 11 is a side cut away view of the sensor assembly of FIG. 2 showing the platen assembly in a position in which the steps of the platen housing have contacted the resilient elements; and, FIG. 12 is a perspective cross-sectional view generally along line 12-12 of FIG. 2 with additional components shown for the control assembly.

FIG. 11 is a side cut away view of the sensor assembly of FIG. 2 showing platen assembly 102 in a position in which steps 128 of platen housing 112 have contacted resilient elements 150. The following should be viewed in light of FIGS. 1 through 11. As shown in FIG. 10, for displacement of the platen housing in direction D1 for a first distance, resilient elements 144 and 150 exert no more than force F1 on the platen housing urging the transparent material toward the sensor housing. In an example embodiment, resilient elements 144 and 150 do not contact the platen housing. In an example embodiment, resilient elements 144 and 150 contact the platen housing and F1 is a nominal amount of force.

As shown in FIG. 11, for displacement of the platen housing in direction D1 for a second distance, greater than the first distance, resilient elements 144 and 150 exert force F2, more than force F1, on the platen housing such that the transparent material is sealed to the sensor housing, for example, to surfaces 142 and 148. In an example embodiment, the second distance is 10 millimeters from a maximum position for the platen housing in direction D1. It should be understood that assembly 100 is not limited to particular first and second distances.

Thus, for initial installation and final removal of the platen housing in and from the sensor housing, resilient elements 144 and 150 offer little or no resistance with respect to the sensor housing, enabling easy movement of the platen housing. However, to ensure a snug seal between the transparent material and the sensor housing, resilient elements 144 and 150 push the platen housing upward during the final travel of the platen housing along the sensor housing. Further, minimizing contact and force between the transparent material and the sensor housing during the majority of the transit of the platen housing across the sensor housing reduces possible damage to the transparent material and the sensor housing.

Returning to FIGS. 3 and 5, in an example embodiment, the platen housing includes handle 184 proximate end E1. Handle 184 is flexible in directions D2 and D3. When the platen housing is inserted in the sensor housing in direction D1, portion 184A of the handle engages the sensor housing and the handle deflects in direction D3. As the platen housing continues to the final travel position, groove 186 aligns with the portion of the sensor housing that had been deflecting portion 184A and the handle displaces in direction D2 such that the groove traps the portion of the sensor housing, locking the platen housing into place with respect to the sensor housing. To remove the platen housing, the handle is depressed in direction D3 so that the portion of the sensor housing clears groove 186.

Figure 12:
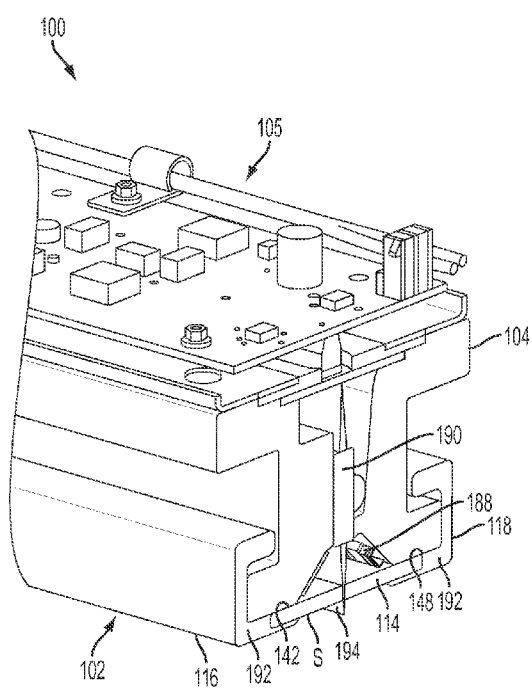

FIG. 12 is a perspective cross-sectional view generally along line 12-12 in FIG. 2 with additional components shown for the control assembly. The following should be viewed in light of FIGS. 1 through 12. In an example embodiment, light emitting elements 188, for example, light emitting diodes, are fixed to housing 104 and lens 190 is located in housing 104. In the example of FIG. 1, assembly 100 is located above material 108 and surfaces 192 are located very close to the material, for example, surfaces 192 are separated by 2 millimeters from the material. As noted above, elements 188 are configured to emit light upon the material and the emitted light reflecting from the material, shown by 194 in FIG. 12, is transmitted through lens 190 for analysis by control assembly 105. For example, control assembly 105 analyzes images included in the reflected light to evaluate the quality of the printed indicia on the material.

As noted above, due to the close proximity of the sensor assembly to the material, detritus, such as paper dust or ink solids, is dispersed toward the sensor. However, the position of the transparent material, the seal of the transparent material against surfaces 142 and 148, and the sealing of ends E1 and E2 against the sensor housing isolate the lens, elements 188, and control assembly 105 in general from the detritus. Isolating the lens, elements 188, and control assembly 105 from the detritus prevents the detritus from coating the lens or elements 188. Since the platen assembly is removable from the sensor housing, the platen can be easily removed to clean any detritus that may accumulate on surface S of material 114, while leaving housing 104 in place. Thus, the use of removable platen 102 eliminates the need to remove sensor housing 104 to clean the lens and elements 188 themselves.

Thus, assembly 100 enables easy maintenance of a printer by a user of the printer, minimizing false error conditions associated with detritus from the printing process and minimizing down time and cost associated with repairs or maintenance by service personnel. For example, a user can easily remove housing 102 to clean the transparent material, in comparison to the requirement for a service person to remove the sensor assembly to clean the lens and elements 188.

It should be understood that assembly 100 is not limited to a particular number or configuration of steps 128 (an analogous steps for segment 188), steps 154 and 158, or resilient elements 144 and 150.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A platen housing for a printer arranged to transport printed material along a path in a process direction, comprising:

first and second ends;

a first side rail segment connecting the first and second ends and including:

a first top surface; and, a first bottom surface forming a plurality of first steps, each first step with a thickness, with respect to the first top surface, less than any first step immediately preceding said each first step in a direction from the first end toward the second end; and, a second side rail segment including:

a second top surface; and, a second bottom surface forming a plurality of second steps, each second step with a thickness, with respect to the second top surface, less than any second step immediately preceding said each second step in a direction from the first end toward the second end, wherein the platen housing is arranged to:

engage a sensor assembly for the printer, disposed orthogonally above the path, and including a plurality of light emitting elements; and, receive a piece of transparent material such that the transparent material is between the path and the plurality of light emitting elements such that the platen housing and the transparent material isolate the light emitting elements from the printed material.

2. The housing of claim 1, wherein:

the first and second top surfaces are coplanar;

each first step includes a respective first step surface;

each second step includes a respective second step surface; and, respective pairs of first and second step surfaces, equidistant from the first end, are coplanar.

3. The housing of claim 1, wherein:

the first side rail segment includes first and second rails: connected by a first side segment orthogonal to the first and second rails; and, forming a first groove facing the second side rail segment;

the first rail includes the first top and bottom surfaces;

the second side rail segment includes third and fourth rails: connected by a second side segment orthogonal to the third and fourth rails; and, forming a second groove facing the first side rail segment;

the third rail includes the second top and bottom surfaces; and, the first and second grooves are arranged to partially surround respective portions of the sensor assembly to connect the platen housing to the sensor assembly.

4. The housing of claim 3, wherein:

the second rail includes a third top surface parallel to the first top surface, facing the first bottom surface, and with a first notch, continuous with the first groove, arranged to receive a piece of transparent material; and, the fourth rail includes a fourth top surface parallel to the second top surface, facing the second bottom surface, and with a second notch, continuous with the second groove, arranged to receive the piece of transparent material.

5. A sensor housing for a printer arranged to transport printed material along a path in a process direction, comprising:
- first and second ends;
- a first side rail segment connecting the first and second ends and including:
  - a first top surface;
  - a first bottom surface; and,
  - a plurality of first resilient elements attached to the first top surface, each first resilient element located further from the first bottom surface than any first resilient element immediately preceding said each first resilient element in a direction from the first end toward the second end;
- a second side rail segment connecting the first and second ends and including:
  - a second top surface;
  - a second bottom surface; and,
  - a plurality of second resilient elements attached to the second top surface, each second resilient element located further from the second bottom surface than any second resilient element immediately preceding said each second resilient element in a direction from the first end toward the second end, wherein the sensor housing is arranged to be disposed orthogonally above the path and house a plurality of light emitting elements.

6. The sensor housing of claim 5, wherein:
- the first top surface forms a plurality of first steps, each first step with a thickness, with respect to the first bottom surface, greater than any first step immediately preceding said each first step in the direction;
- a respective first resilient element is attached to said each first step;
- the second top surface forms a plurality of second steps, each second step with a thickness, with respect to the second bottom surface, greater than any second step immediately preceding said each second step in the direction; and,
- a respective second resilient element is attached to said each second step.

7. The sensor housing of claim 5, wherein the sensor housing is arranged to receive a platen housing including a piece of transparent material disposed between the plurality of light emitting elements and the path.

8. A sensor assembly for a printer arranged to transport printed material along a path in a process direction, comprising:
- a longitudinal axis;
- a sensor housing including:
  - first and second top surfaces; and,
  - a plurality of resilient elements fixed to the first and second top surfaces; and,
- a platen assembly including:
  - a platen housing with a plurality of steps; and,
  - transparent material, wherein:
    - the sensor housing is arranged to house a plurality of light emitting elements;
    - the platen assembly is arranged to engage a first end of the sensor housing and displace in a first direction along the sensor housing toward a second end of the sensor housing such that the transparent material is aligned with the plurality of light emitting elements in a direction orthogonal to the longitudinal axis; and,
    - as the platen assembly displaces in the first direction, the plurality of resilient elements is arranged to engage the plurality of steps to urge the piece of transparent material into contact with the sensor housing with progressively greater force such that the transparent material is sealed against the sensor housing.

9. The sensor assembly of claim 8, wherein:
- for displacement of the platen housing in the first direction for a first distance, the plurality of resilient elements exerts no more than a first force on the platen housing; and,
- for displacement of the platen housing in the first direction for a second distance, greater than the first distance, the plurality of resilient elements exerts a second force, greater than the first force, on the platen housing such that the transparent material is sealed to the sensor housing.

10. The sensor assembly of claim 8, wherein the platen housing includes:
- a first side rail segment including a third top surface and a first bottom surface forming a plurality of first steps, each first step with a thickness, with respect to the third top surface, less than any first step surface immediately preceding said each first step in the first direction; and,
- a second side rail segment including a fourth top surface and a second bottom surface forming a plurality of second steps, each second step with a thickness, with respect to the fourth top surface, less than any second step surface immediately preceding said each second step in the first direction.

11. The sensor assembly of claim 10, wherein:
- the sensor housing includes third and fourth bottom surfaces;
- the first top surface forms a plurality of third steps, each third step with a thickness, with respect to the third bottom surface, greater than any third step immediately preceding said each third step in the direction;
- a respective resilient element from the plurality of resilient elements is attached to said each first step;
- the second top surface forms a plurality of fourth steps, each fourth step with a thickness, with respect to the fourth bottom surface, greater than any fourth step immediately preceding said each fourth step in the direction; and,
- a respective resilient element from the plurality of resilient elements is attached to said each fourth step.

12. The sensor assembly of claim 11, wherein:
- for displacement of the platen housing in the first direction for a first distance, the plurality of resilient elements is free of contact with the pluralities of first and second steps; and,
- for displacement of the platen housing in the first direction for a second distance, greater than the first distance, the plurality of resilient elements contacts the pluralities of first and second steps to urge the transparent material against the sensor housing.

13. The sensor assembly of claim 10, wherein:
- the platen housing includes first and second ends connected by the first and second side rail segments; and,
- the sensor housing includes first and second sealing elements arranged to contact the first and second ends to seal the first and second ends against the sensor housing.

14. A printer arranged to transport printed media along a plane in a process direction, comprising a sensor assembly, disposed above the plane in a transverse direction orthogonal to the process direction, including:

a plurality of light emitting elements;
a sensor housing with:
- a first sensor side rail including a first bottom surface and a first top surface forming a plurality of first steps, each first step with a thickness, with respect to the first bottom surface, greater than any first step immediately preceding said each first step in a first direction parallel to the traverse direction;
- a second sensor side rail including a second bottom surface and a second top surface forming a plurality of second steps, each second step with a thickness, with respect to the second bottom surface, greater than any second step immediately preceding said each second step in the first direction; and,
- a respective resilient element fixed to each first and second step; and, a platen assembly including:
- a platen housing engageable with and removable from the sensor housing in the traverse direction and including:
  - a first platen side rail including a third top surface and a third bottom surface forming a plurality of third steps, each third step with a thickness, with respect to the third top surface, less than any third step immediately preceding said each third step in the first direction;
  - a second platen side rail including a fourth top surface and a fourth bottom surface forming a plurality of fourth steps, each fourth step with a thickness, with respect to the fourth top surface, less than any fourth step immediately preceding said each fourth step in the first direction; and,
- transparent material fixed to the platen housing, wherein:
  - when the platen housing is engaged the sensor housing and displaced a maximum distance in the first direction, the transparent material is between the plane and the light emitting elements and the respective resilient elements engage the pluralities of third and fourth steps to apply a first force to the platen housing to urge the transparent material into sealing contact with the sensor housing; and,
  - when the platen housing is engaged with the sensor housing and displaced a distance in the first direction less than the maximum distance, the respective resilient elements are free of contact with the pluralities of third and fourth steps such that the transparent material is free of contact with the sensor housing.

15. The printer of claim 14 wherein:
the sensor housing includes a longitudinal axis; and,
when the platen housing is engaged with the sensor housing and displaced the distance in the first direction less than the maximum distance, at least a respective portion of each first and second step is aligned with the sensor housing in a direction orthogonal to the longitudinal axis.

16. A method of sealing a sensor assembly for a printer arranged to transport printed material along a path in a process direction, the sensor assembly including a sensor housing and a platen assembly, comprising:
engaging a first end of a platen housing with a first end of the sensor housing;
applying progressively greater force to the platen housing to urge transparent material fixedly connected to the platen housing into contact with the sensor housing by:
- displacing the platen housing a first distance in a first direction toward a second end of the sensor housing; and,
- displacing the first end of the platen housing an additional distance in the first direction, such that a plurality of resilient elements fixed to first and second top surfaces of the sensor housing engages a plurality of first steps of the platen housing;
aligning the transparent material with a plurality of light emitting elements disposed in the sensor housing in a direction orthogonal to the first and second top surfaces; and,
sealing the transparent material against the sensor housing.

17. A method of claim 16, wherein:
displacing the platen housing a first distance in a first direction includes displacing the platen housing such that the plurality of resilient elements is free of engagement with the plurality of stepped surfaces and applies no more than a first force to the platen housing; and,
displacing the first end of the platen housing an additional distance includes displacing the platen housing such that the plurality of resilient elements applies a second force, greater than the first force, to the platen housing to urge the transparent material into contact with the sensor housing.

18. The method of claim 17, wherein:
the platen housing includes:
- a first side rail segment including a third top surface and a first bottom surface forming a plurality of second steps included in the plurality of first steps, each second step with a thickness, with respect to the third top surface, less than any second step surface immediately preceding said each second step in the first direction; and,
- a second side rail segment including a fourth top surface and a second bottom surface forming a plurality of third steps included in the plurality of first steps, each third step with a thickness, with respect to the fourth top surface, less than any third step surface immediately preceding said each third step in the first direction; and,
displacing the first end of the platen housing an additional distance includes engaging the plurality of resilient elements with second and third steps.

19. The method of claim 18, wherein:
the sensor housing includes:
- a first sensor side rail including the first top and a third bottom surface; and,
- a second sensor side rail including the second top and a fourth bottom surface;
the first top surface forms a plurality of third steps, each third step with a thickness, with respect to the third bottom surface, greater than any third step surface immediately preceding said each third step in the first direction;
the second top surface forms a plurality of fourth steps, each fourth step with a thickness, with respect to the fourth bottom surface, greater than any fourth step surface immediately preceding said each fourth step in the first direction;
a first plurality of resilient elements from the plurality of resilient element is connected to the plurality of third steps;
a second plurality of resilient elements from the plurality of resilient element is connected to the plurality of fourth steps; and, engaging the plurality of resilient elements with first and second steps includes:
  simultaneously engaging each resilient element in the first plurality of resilient elements with a first step from the plurality of first steps; and,
  simultaneously engaging each resilient element in the second plurality of resilient elements with a second step from the plurality of second steps.

20. The method of claim 16, wherein:
the sensor housing includes a longitudinal axis; and,
displacing the platen housing the first distance in the first direction includes aligning every stepped surface of the platen housing with the sensor housing in a direction orthogonal to the longitudinal axis.

\* \* \* \* \*